No. 783,311. PATENTED FEB. 21, 1905.
C. J. REED.
RIM SECTION FOR EXPANSIBLE PULLEYS.
APPLICATION FILED MAY 25, 1904.

Witnesses:
R. A. Baldwin.
J. B. Hill.

Inventor:
Charles J. Reed,
by Ryemers & Townsend,
Att'ys.

No. 783,311. Patented February 21, 1905.

UNITED STATES PATENT OFFICE.

CHARLES J. REED, OF PHILADELPHIA, PENNSYLVANIA, ASSIGNOR TO REED MORRILL ELECTRIC CO., A CORPORATION OF PENNSYLVANIA.

RIM-SECTION FOR EXPANSIBLE PULLEYS.

SPECIFICATION forming part of Letters Patent No. 783,311, dated February 21, 1905.

Application filed May 25, 1904. Serial No. 209,724.

*To all whom it may concern:*

Be it known that I, CHARLES J. REED, a citizen of the United States, residing at Philadelphia, in the county of Philadelphia and State of Pennsylvania, have invented certain new and useful Improvements in Rim-Sections for Expansible Pulleys, of which the following is a specification.

In United States Patents Nos. 758,474 and 758,561, granted to me April 26, 1904, I have shown expansible pulleys each drum of which comprises a set of radially-adjustable rim-sections the ends of which pass through radial slots in circular guide-plates and have teeth entering spiral grooves in circular adjusting-disks. Both the sides and the teeth of such rim-sections ordinarily fit somewhat loosely in the guide-slots and spiral grooves to prevent undue friction and binding of the sections as they are shifted to vary the diameter of the drum. This looseness permits the rim-sections which are not beneath the belt to be thrown slightly outward by centrifugal action; but the pressure of the belt again forces them against the inner walls of the grooves. Each rim-section thus moves slightly outward and inward during every revolution of the pulley, and this movement occasions unnecessary noise and wear.

The present invention is an improved rim-section for pulleys of this type which is provided with resilient toothed ends to frictionally engage either the sides of the guide-slots or the walls of the spiral grooves, or both.

Figure 1:
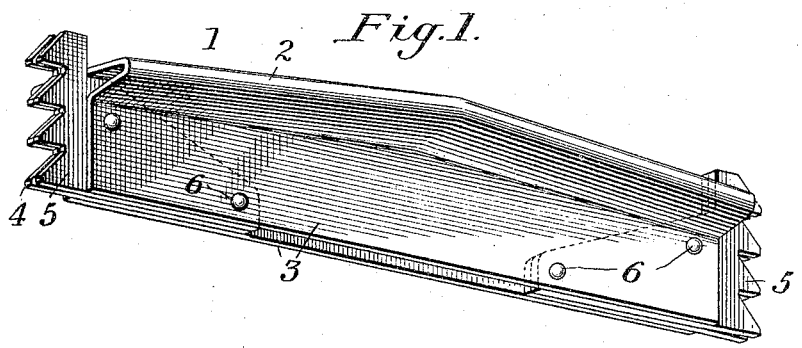
Figure 2:
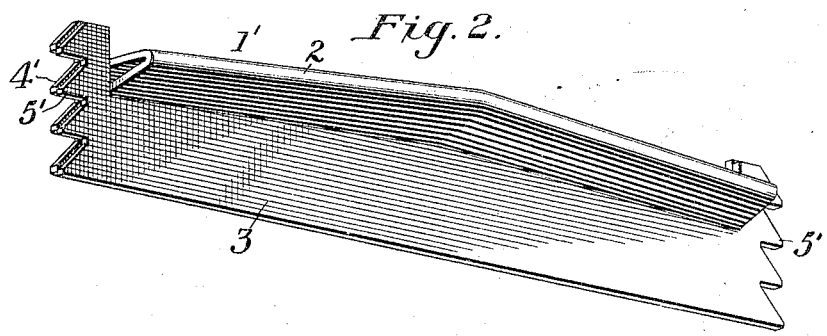
Figure 3:
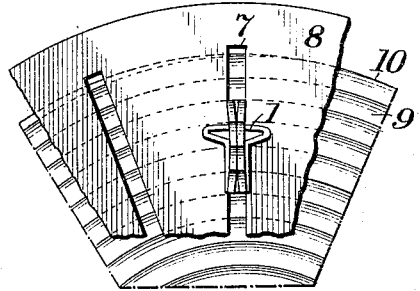
Figure 4:
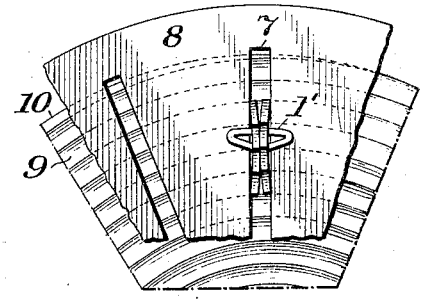
Figure 5:
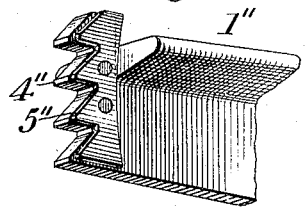

Referring to the accompanying drawings, Figure 1 is a perspective view of a rim-section having double resilient toothed end portions which are sprung apart to bear against the sides of the guide-slots. Fig. 2 is a perspective view of a modified rim-section, the teeth of which are arranged to frictionally bear against the walls of the spiral grooves. Fig. 3 is a side elevation of a portion of one guide-plate and adjusting-disk, showing one of the rim-sections of Fig. 1 in place. Fig. 4 is a view similar to Fig. 3, but showing one rim-section of the type illustrated in Fig. 2; and Fig. 5 is a perspective view of one end of a rim-section of cast metal having a resilient piece secured to one side of the toothed end.

The rim-section shown in Fig. 1 has a belt-receiving portion 2 and sides 3, which are bent out of a piece of sheet-steel. Two toothed end pieces 4 5, also of sheet-steel, are riveted between the sides 3 at each end of the section. These end pieces are slightly sprung apart, preferably at their upper and lower ends, so that they bear against the sides of the guide-slots 7 in the guide-plate 8, as indicated in Fig. 3. The friction between the end pieces and the sides of the slot should be sufficient to prevent the rim-sections being thrown outward by centrifugal action.

The rim-section shown in Fig. 2 has a belt-receiving portion 2, sides 3, and toothed end pieces 4' 5', which are bent out of a single piece of sheet-steel. The teeth in the pieces 4' 5' are cut in such positions that they are normally slightly out of alinement, as shown. The teeth of piece 4' are somewhat higher, so that they bear against the inclined upper wall of the spiral groove 9 in the adjusting-disk 10, while the teeth of piece 5' bear against its lower wall. The pieces 4 and 5 may also be sprung slightly apart, so as to bear against the walls of the guide-slots, as shown in Fig. 4.

While the rim-sections are preferably bent out of sheet metal, they may be of cast metal, with integral toothed ends 4''. A toothed or straight piece 5'' is then riveted to the end 4'', being sprung away at its upper and lower ends to secure the desired frictional contact with the sides of the guide-slots.

I claim—

1. In an expansible pulley, a radially-adjustable rim-section, having resilient ends, as set forth.

2. A rim-section for expansible pulleys, having resilient toothed ends, as set forth.

3. A rim-section for expansible pulleys, having at each end two resilient pieces which are slightly sprung apart, as set forth.

4. A rim-section for expansible pulleys, having at each end two resilient toothed pieces which are slightly sprung apart, as set forth.

5. In an expansible pulley, a radially-adjustable rim-section, having a belt-receiving portion and a body bent out of sheet metal, as set forth.

6. A rim-section for expansible pulleys, having a belt-receiving portion and sides bent out of sheet metal, and end pieces secured between the sides, as set forth.

7. A rim-section for expansible pulleys, having a belt-receiving portion and sides bent out of sheet metal, and resilient toothed end pieces secured between the sides, as set forth.

8. A rim-section for expansible pulleys, having a belt-receiving portion and sides bent out of sheet metal, and resilient toothed pieces secured between the sides at each end of the section, said end pieces being slightly sprung apart, as set forth.

In testimony whereof I affix my signature in presence of two witnesses.

CHARLES J. REED.

Witnesses:
 EUGENE A. BYRNES,
 ROBT. B. FLETCHER.